US009264582B2

(12) United States Patent
Koike

(10) Patent No.: US 9,264,582 B2
(45) Date of Patent: Feb. 16, 2016

(54) PRINTING APPARATUS, INFORMATION PROCESSING APPARATUS, METHOD FOR CONTROLLING PRINTING APPARATUS, METHOD FOR CONTROLLING INFORMATION PROCESSING APPARATUS, AND STORAGE MEDIUM

(75) Inventor: Hisashi Koike, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 242 days.

(21) Appl. No.: 13/237,582

(22) Filed: Sep. 20, 2011

(65) Prior Publication Data

US 2012/0075646 A1 Mar. 29, 2012

(30) Foreign Application Priority Data

Sep. 28, 2010 (JP) ................................. 2010-216538
Jul. 22, 2011 (JP) ................................. 2011-160465

(51) Int. Cl.
*H04N 1/60* (2006.01)
*G06K 15/02* (2006.01)

(52) U.S. Cl.
CPC .............. *H04N 1/60* (2013.01); *G06K 15/1809* (2013.01)

(58) Field of Classification Search
USPC .................. 358/1.1, 1.6, 1.9, 1.13, 1.18, 2.1; 399/16, 23, 75, 81, 82, 85
See application file for complete search history.

(56) References Cited

U.S. PATENT DOCUMENTS

| 6,285,844 B1 * | 9/2001 | Kuga ............................... 399/85 |
| 7,728,992 B2 * | 6/2010 | Yamamoto et al. ........... 358/1.13 |
| 7,852,504 B2 * | 12/2010 | Tanaka ......................... 358/1.15 |
| 2002/0085186 A1 * | 7/2002 | Sawada ......................... 358/474 |
| 2003/0160979 A1 * | 8/2003 | Tuchtenhagen ................ 358/1.6 |
| 2005/0031392 A1 * | 2/2005 | Yamamoto et al. ............. 400/62 |
| 2005/0104272 A1 | 5/2005 | Watanabe |
| 2005/0105146 A1 * | 5/2005 | Tanaka .......................... 358/498 |
| 2006/0002752 A1 * | 1/2006 | Ebuchi ............................. 400/76 |
| 2008/0240782 A1 * | 10/2008 | Minakuchi .................... 399/124 |
| 2009/0245818 A1 * | 10/2009 | Miyazaki ........................ 399/16 |
| 2009/0261524 A1 * | 10/2009 | Nakayama et al. .......... 271/3.14 |
| 2010/0034550 A1 * | 2/2010 | Arai et al. ........................ 399/81 |
| 2010/0189450 A1 * | 7/2010 | Hosoda .......................... 399/82 |
| 2011/0080604 A1 * | 4/2011 | Liu .............................. 358/1.13 |
| 2011/0242581 A1 * | 10/2011 | Lee ............................. 358/1.15 |
| 2011/0267640 A1 * | 11/2011 | Takahashi .................... 358/1.15 |
| 2013/0002750 A1 * | 1/2013 | Takenouchi .................... 347/16 |

FOREIGN PATENT DOCUMENTS

| CN | 1184959 A | 6/1998 |
| JP | 2001-018494 A | 1/2001 |
| JP | 2001328740 A | 11/2001 |

(Continued)

*Primary Examiner* — Kimberly A Williams

(74) *Attorney, Agent, or Firm* — Canon U.S.A, Inc. IP Division

(57) ABSTRACT

A host computer generates a print job and transmits it to a printing apparatus. A media group definition defining one or a plurality of groups each combining a plurality of specified media with one or a plurality of feedable search media is added to each print job. The printing apparatus acquires the media group definition from the received print job, acquires, from the media group definition, feedable search media corresponding to the specified media for each page included in the print job, searches for a sheet feed stage storing any one of the feedable search media based on sheet feed stage information, feeds the print medium from the detected sheet feed stage, and prints the page on the print medium.

7 Claims, 13 Drawing Sheets

(56) References Cited

FOREIGN PATENT DOCUMENTS

| JP | 2005-128651 A | 5/2005 |
| JP | 2005-144815 A | 6/2005 |
| JP | 2007-057944 A | 3/2007 |
| JP | 2007-126293 A | 5/2007 |
| JP | 2009-256076 A | 11/2009 |
| JP | 2009256075 A | 11/2009 |

* cited by examiner

FIG.4A

| JOB ATTRIBUTE | PAGE ATTRIBUTE | PAGE DATA | PAGE ATTRIBUTE | PAGE DATA | PAGE ATTRIBUTE | PAGE DATA |
|---|---|---|---|---|---|---|
| 501 | 511 | 512 | | | | |
| | PAGE 1 | | PAGE 2 | | PAGE 3 | |

| JOB ATTRIBUTE | NO MEDIA SPECIFICATION SHEET FEED STAGE AUTO A4 | PAGE DATA | NO MEDIA SPECIFICATION SHEET FEED STAGE AUTO A4 | PAGE DATA | NO MEDIA SPECIFICATION SHEET FEED STAGE AUTO A4 | PAGE DATA |
|---|---|---|---|---|---|---|

FIG.4C

| JOB ATTRIBUTE | PLAIN PAPER SHEET FEED STAGE AUTO A4 | PAGE DATA | PLAIN PAPER SHEET FEED STAGE AUTO A4 | PAGE DATA | PLAIN PAPER SHEET FEED STAGE AUTO A4 | PAGE DATA |
|---|---|---|---|---|---|---|

FIG.4D

| JOB ATTRIBUTE | ONE-SIDED COATED PAPER 1 PAPER FEED TRAY AUTO A4 | PAGE DATA | COLORED PAPER PAPER FEED TRAY AUTO A4 | PAGE DATA | NO MEDIA SPECIFICATION SHEET FEED STAGE AUTO A4 | PAGE DATA |
|---|---|---|---|---|---|---|

FIG.5C

| JOB ATTRIBUTE | PAGE ATTRIBUTE | PAGE DATA | PAGE ATTRIBUTE | PAGE DATA | PAGE ATTRIBUTE | PAGE DATA |
|---|---|---|---|---|---|---|
| | NO MEDIA SPECIFICATION | COLORED PAPER | PLAIN PAPER | RECYCLED PAPER 1 | RECYCLED PAPER 2 | THICK PAPER 1 | THICK PAPER 2 | ONE-SIDED COATED PAPER 1 | ONE-SIDED COATED PAPER 2 |
| PLAIN PAPER | COLORED PAPER | PLAIN PAPER | RECYCLED PAPER 1 | RECYCLED PAPER 2 | THICK PAPER 1 | THICK PAPER 2 | ONE-SIDED COATED PAPER 1/ ONE-SIDED COATED PAPER 2 |

FIG.5D

| JOB ATTRIBUTE | PAGE ATTRIBUTE | PAGE DATA | PAGE ATTRIBUTE | PAGE DATA |
|---|---|---|---|---|
| | NO MEDIA SPECIFICATION | ONE-SIDED COATED PAPER 1 | ONE-SIDED COATED PAPER 2 |
| PLAIN PAPER | ONE-SIDED COATED PAPER 1/ ONE-SIDED COATED PAPER 2 |

FIG.10

| JOB ATTRIBUTE | PAGE ATTRIBUTE | PAGE DATA | PAGE ATTRIBUTE | PAGE DATA | PAGE ATTRIBUTE | PAGE DATA | PAGE ATTRIBUTE | PAGE DATA |
|---|---|---|---|---|---|---|---|---|
| MONOCHROME PAGE | | NO MEDIA SPECIFICATION | COLORED PAPER | PLAIN PAPER | | RECYCLED PAPER 1 / RECYCLED PAPER 2 | THICK PAPER 1 / THICK PAPER 2 | ONE-SIDED COATED PAPER 1 / ONE-SIDED COATED PAPER 2 |
| | | | | | RECYCLED PAPER 1 | RECYCLED PAPER 2 | THICK PAPER 1 | THICK PAPER 2 | ONE-SIDED COATED PAPER 1 | ONE-SIDED COATED PAPER 2 |
| | | PLAIN PAPER / RECYCLED PAPER 1 / RECYCLED PAPER 2 | COLORED PAPER | PLAIN PAPER | RECYCLED PAPER 1 | RECYCLED PAPER 2 | THICK PAPER 1 | THICK PAPER 2 | ONE-SIDED COATED PAPER 1 | ONE-SIDED COATED PAPER 2 |
| COLOR PAGE | | NO MEDIA SPECIFICATION | COLORED PAPER | PLAIN PAPER | | RECYCLED PAPER 1 / RECYCLED PAPER 2 | THICK PAPER 1 / THICK PAPER 2 | ONE-SIDED COATED PAPER 1 / ONE-SIDED COATED PAPER 2 |
| | | | | | RECYCLED PAPER 1 | RECYCLED PAPER 2 | THICK PAPER 1 | THICK PAPER 2 | ONE-SIDED COATED PAPER 1 | ONE-SIDED COATED PAPER 2 |
| | | PLAIN PAPER | COLORED PAPER | PLAIN PAPER | RECYCLED PAPER 1 | RECYCLED PAPER 2 | THICK PAPER 1 | THICK PAPER 2 | ONE-SIDED COATED PAPER 1 | ONE-SIDED COATED PAPER 2 |

PRINTING APPARATUS, INFORMATION PROCESSING APPARATUS, METHOD FOR CONTROLLING PRINTING APPARATUS, METHOD FOR CONTROLLING INFORMATION PROCESSING APPARATUS, AND STORAGE MEDIUM

BACKGROUND OF THE INVENTION

1. Field of the Invention

The present invention relates to a printing apparatus, an information processing apparatus, a method for controlling the printing apparatus, a method for controlling the information processing apparatus, and a storage medium.

2. Description of the Related Art

A known printing apparatus is capable of performing rasterization, storage, printing, and other processing in parallel based on jobs transmitted from a plurality of host computers via a network. Such printing apparatuses include small- to medium-sized office apparatuses which enable a plurality of users to enter each individual print job and acquire a print result.

In addition to the above-mentioned apparatuses, some comparatively large-sized apparatuses are operated by a dedicated operator. With such printing apparatuses, print jobs are entered from a plurality of host computers and an operator replaces print sheets and changes the order of print jobs to increase the printing efficiency. Printing apparatuses of this kind are referred to as print on demand (POD) apparatuses. Some of conventional printing apparatuses enable specifying of not only the paper size and sheet feed stage but also the type of print medium (hereinafter referred to simply as medium) when paper to be fed is indicated. A media type refers to a name assigned to a set of paper characteristics such as the surface property, grammage, shape, and color. Each apparatus has specific media types defined therefor. "THICK PAPER", "OHP SHEET", "RECYCLED PAPER", "COLORED PAPER", and "COATED PAPER" are exemplary media types. In addition to using media types specifically defined for an apparatus, a user may define specific media and media types and register them in the apparatus.

Some of conventional printing apparatuses are known to have functions of automatic sheet feed stage selection and automatic sheet feed stage changeover.

Automatic sheet feed stage selection refers to a function of automatically selecting, if none of sheet feed stages is specified when a print job is started, a sheet feed stage most suitable for a specified sheet size and media type.

Automatic sheet feed stage changeover refers to a function of automatically changing, if paper in the current sheet feed stage runs out or falls below a certain paper amount during execution of a print job and paper feeding, the current sheet feed stage to another sheet feed stage storing the paper of the same size to continue printing.

Generally, an office user rarely uses special paper and often enters a print job (as illustrated in FIG. 4B) to a printing apparatus without specifying the media type. If the media type is not specified, the printing apparatus performs an operation predetermined for each model, for example, it selects the media type from plain paper, thin paper, recycled paper, colored paper, and thick paper before printing.

With respect to office apparatuses, since basically a small number of media types is supported and special paper is rarely placed on a sheet feed stage, there have been few problems even without media specification. Further, when using an apparatus operating on special paper, a print job for which the user explicitly specifies plain paper (as illustrated in FIG. 4C) feeds only plain paper but does not feed other media types, and therefore there have been no problems.

In the POD environment, it is not rare that a user specifies special paper. Inmost cases, the user specifies the media type for each page, or the user specifies a sheet feed stage and an operator prepares paper for the sheet feed stage. In such an environment, the user uses a print job (as illustrated in FIG. 4D) specifying a different media type for each page.

Japanese Patent Application Laid-Open No. 2007-57944 discusses a technique for not feeding paper from an open sheet feed stage as a method for avoiding using undesired paper if none of sheet feed stages is specified. This technique enables performing both automatic sheet feed stage selection and automatic sheet feed stage changeover only in a desired range of sheet feed stages.

In recent years, with the increase in printer engine speed and controller processing speed, office apparatuses have become comparable to large-sized POD models in performance while maintaining their small sizes.

Since a POD apparatus is large-sized and requires a large installation area, a backup apparatus cannot be easily installed. In some cases, a high-speed office apparatus is installed as a backup apparatus although the operating speed and durability are not equal to those of a specialized apparatus.

Accordingly, an apparatus called LitePOD model that combines a high-speed printer engine and controller hardware for office use with increased operability for operator has been put on the market. If the function of a high-speed office apparatus can be combined with the function of a POD apparatus in one machine, manufacturing cost is reduced, enabling users to utilize the apparatus at low prices.

Japanese Patent Application Laid-Open No. 2009-256076 discusses a technique for an image forming apparatus which groups a plurality of paper feed trays and, when one paper feed tray becomes empty, switches to another paper feed tray of the same group. The technique excludes from a group a paper feed tray storing paper having different paper attribute and includes the paper feed tray in a group having the same paper attribute.

In recent years, from the viewpoint of recycling, it has become necessary in offices to use different paper for each purpose, for example, recycled paper for in-house documents and draft printing, and plain paper for documents for external use. However, if a user enters a print job with "NO MEDIA SPECIFICATION", in a case where both recycled paper and plain paper are usable, to an apparatus having a plurality of media types set therein, colored paper may be fed by the above-mentioned function of automatic sheet feed stage selection (problem a).

In an apparatus operated under the above-mentioned condition, if plain paper is explicitly specified in a print job, plain paper can be fed. However, when plain paper runs out, the function of automatic sheet feed stage changeover does not function and the apparatus stops (displaying a paper-out message) even if another sheet feed stage holds sufficient amount of recycled paper. This is because plain paper and recycled paper are recognized as different media types. In this case, the user needs to do some troublesome work, i.e., replace paper or forcibly change the target sheet feed stage (problem b).

The above-mentioned problems a and b can be avoided by using the technique discussed in Japanese Patent Application Laid-Open No. 2007-57944, by closing only the sheet feed stage storing required paper and opening other sheet feed stages. However, in the case of an office apparatus used by many users, except for a POD apparatus operated by a dedicated operator, it is troublesome and impractical that a user operates sheet feed stages before entering a print job.

As described above, even if one paper feed tray becomes empty, printing can be performed by switching to another paper feed tray of the same group by using the technique discussed in Japanese Patent Application Laid-Open No. 2009-256076. However, with the technique discussed in Japanese Patent Application Laid-Open No. 2009-256076, it is necessary to prepare a plurality of paper feed trays storing paper having the same paper attribute. In an environment where many different types of paper need to be set in paper feed trays, this technique cannot be applied because a number of paper feed trays is insufficient.

In an environment where a dedicated POD apparatus (specialized apparatus) is installed, an operator may reassign a print job to a backup LitePOD apparatus because of a tight schedule of the specialized apparatus. If the reassigned job requires paper supported only by the specialized apparatus, for example, one-sided coated paper 1 is demanded, the LitePOD apparatus not supporting one-sided coated paper 1 will generate an error or feed default paper, for example, plain paper.

In some cases, a user does not inevitably need to use one-sided coated paper 1 in the print job but may accept the use of one-sided coated paper 2 supported by the LitePOD apparatus. Even in this case, however, there is a problem that the LitePOD apparatus generates an error or feeds unintended paper (plain paper) and performs printing (problem c). Thus, if the printing apparatus does not have paper of the same media type as the one specified in the print job, the conventional technique has been unable to flexibly address this problem.

As mentioned above, from the viewpoint of recycling, there has been a demand for flexibly changing paper on a job basis, for example, recycled paper for draft printing and plain paper (and one-sided coated paper 1 for some pages) for documents for external use. However, the technique discussed in Japanese Patent Application Laid-Open No. 2009-256076 groups paper feed trays of a printing apparatus and therefore cannot flexibly change paper on a job basis (problem d).

SUMMARY OF THE INVENTION

The present invention is directed to providing a mechanism capable of preventing printing on media not intended by a user and performing printing on media permitted by the user even if media specified by a print job is not set in a sheet feed stage of a printing apparatus or if no medium is specified in a print job.

According to an aspect of the present invention, a printing apparatus includes: a receiving unit configured to receive a print job including settings of definition information and designation information, the definition information defining one or a plurality of pieces of sheet information as one group out of sheet information for identifying a sheet usable for printing, the designation information specifying a group to be used for printing out of the plurality of groups defined by the definition information; and a printing unit configured to execute the print job by using a sheet indicated in the sheet information included in the group specified by the designation information.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 4A to 4D illustrate configurations of print jobs.

FIGS. 5A to 5D illustrate media group definitions according to a first exemplary embodiment.

FIG. 10 illustrates a media group definition according to the second exemplary embodiment.

DESCRIPTION OF THE EMBODIMENTS

Various exemplary embodiments, features, and aspects of the invention will be described in detail below with reference to the drawings.

A printing system according to a first exemplary embodiment of the present invention will be described below.

Figure 1:
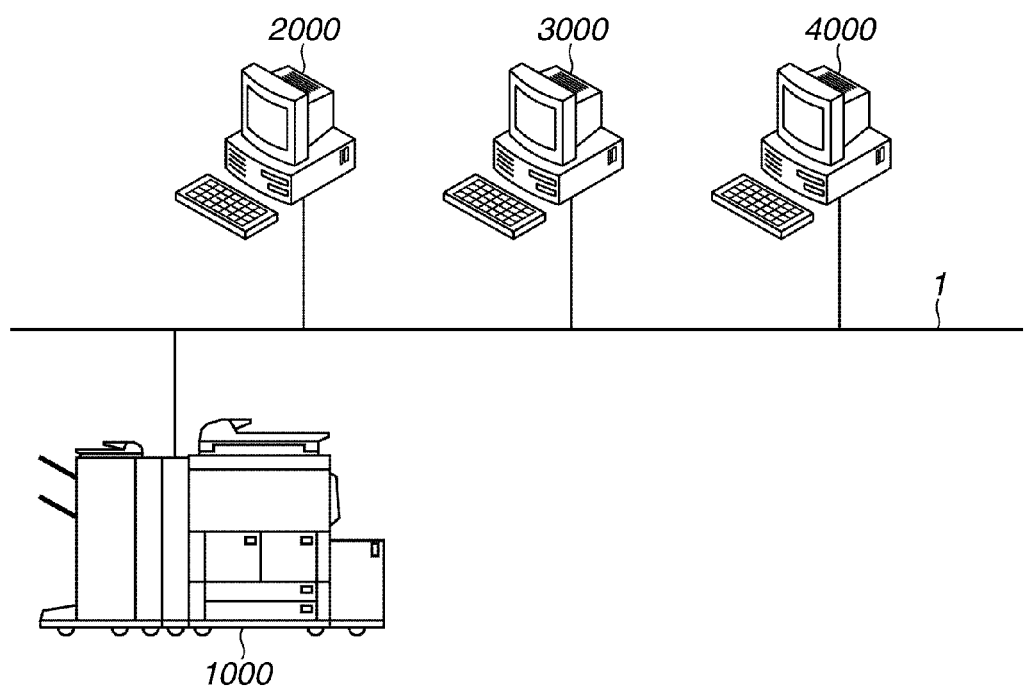
FIG. 1 schematically illustrates an exemplary printing system according to an exemplary embodiment of the present invention.

FIG. 1 schematically illustrates an exemplary printing system according to an exemplary embodiment of the present invention.

Referring to FIG. 1, the printing system includes a network 1 such as a local area network (LAN), a printing apparatus 1000, and host computers 2000, 3000, and 4000 which transmit a print job to the printing apparatus 1000 via the network 1.

The printing apparatus 1000 executes a print job transmitted from the host computers 2000, 3000, and 4000 to perform printing to media (sheets).

Figure 2:
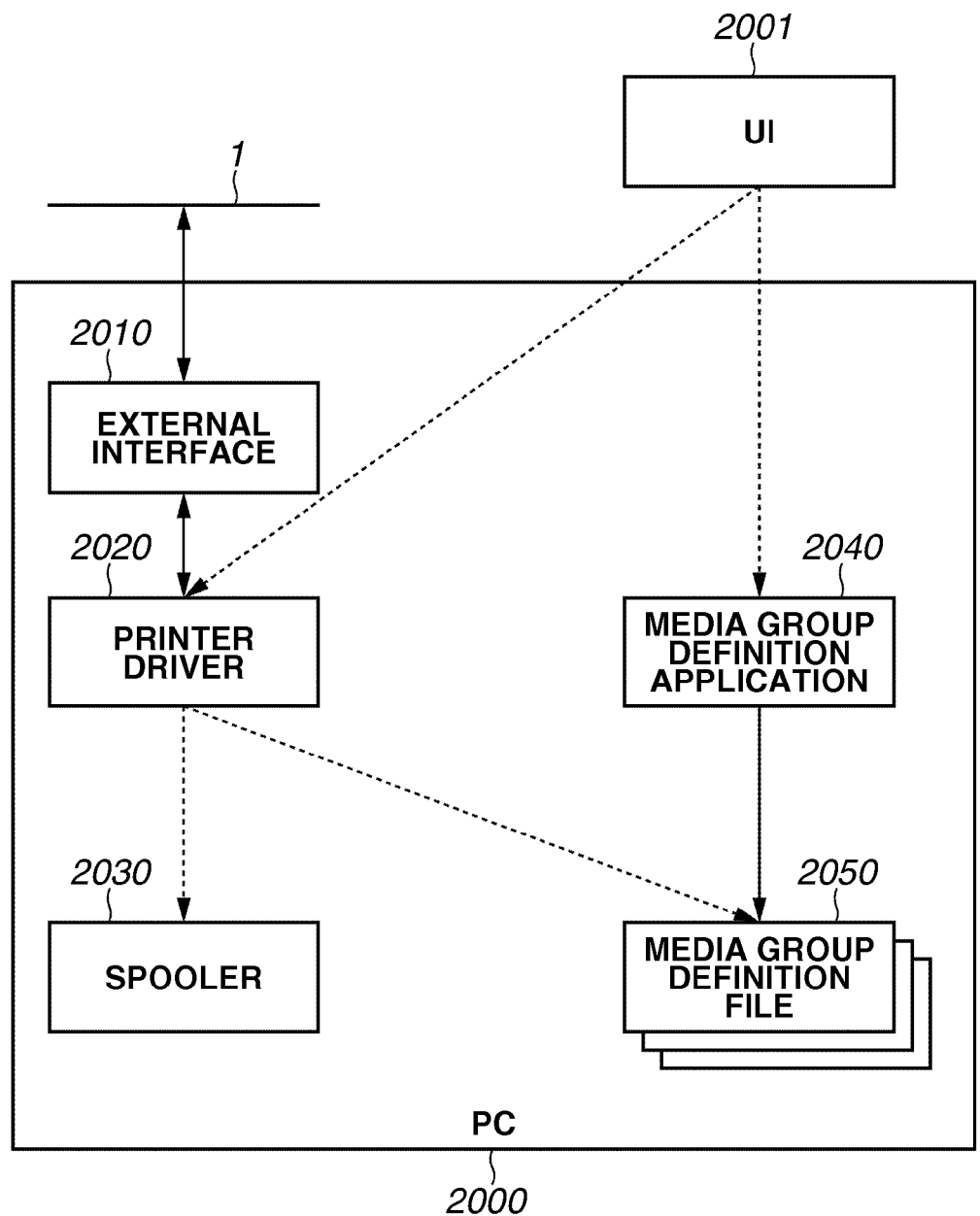
FIG. 2 schematically illustrates an internal configuration of a host computer.

FIG. 2 schematically illustrates an internal configuration of the host computers 2000, 3000, and 4000. Referring to FIG. 2, the host computers 3000 and 4000 have the same configuration as the host computer 2000.

Referring to FIG. 2, a UI 2001 includes a display, a pointing device such as a mouse and a touch panel, and a keyboard.

An external interface 2010 is a network interface for mainly connecting the host computer 2000 to the network 1.

A printer driver 2020 enters a print job in the printing apparatus 1000. A spooler 2030 temporarily stores data when a print job is entered in the printing apparatus 1000.

A media group definition application program 2040 (hereinafter referred to as media group definition application) is an application program for creating and correcting a media group definition file 2050. The media group definition file 2050 is a file for recording information about media group definitions as illustrated in FIGS. 5A to 5D. From the UI 2001, a user activates the media group definition application 2040, and creates a new media group definition file 2050 or corrects an existing media group definition file 2050.

With the host computer 2000 according to the present exemplary embodiment, when the user prints a print job, the created media group definition file 2050 can be given as a job attribute to the print job including PDL data spooled in the spooler 2030 by the printer driver 2020. A print job is transmitted, together with the media group definition file 2050, from the external interface 2010 to the printing apparatus 1000 via the network 1.

The host computers 2000, 3000, and 4000 are ordinary computers (information processing apparatuses) such as personal computers (PCs). Although not illustrated in the present exemplary embodiment, each of the host computers 2000, 3000, and 4000 is provided with hardware such as a central processing unit (CPU) (processor), a read-only memory (ROM), a random access memory (RAM), and an external storage unit such as a hard disk drive (HDD) and a solid state drive (SSD). The configuration illustrated in FIG. 2 indicates functions implemented when the CPU of the host computer 2000 executes a relevant program computer-readably recorded in the external storage unit and the ROM, and data computer-readably recorded in the external storage unit and the RAM.

Figure 3:
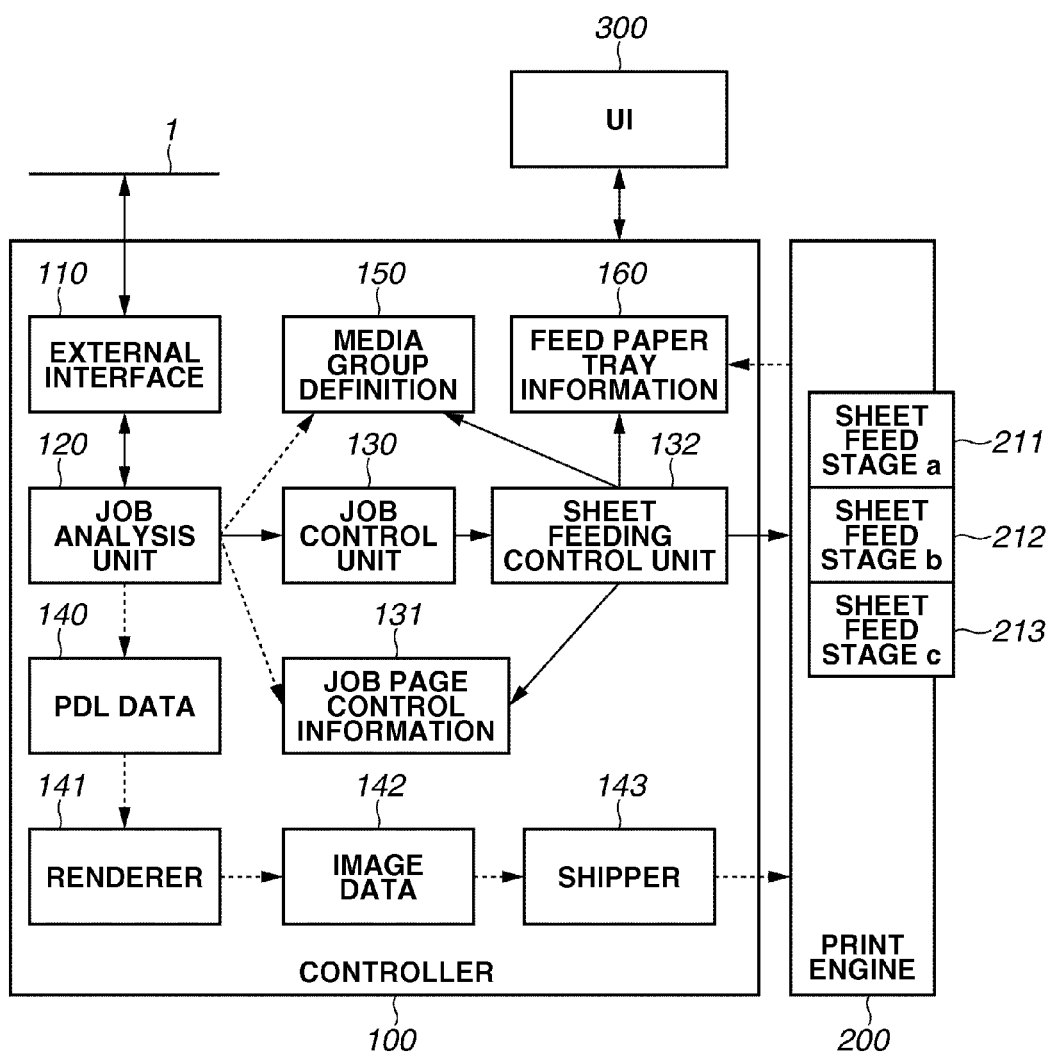
FIG. 3 schematically illustrates an internal configuration and peripheral configuration of a controller included in a printing apparatus.

FIG. 3 schematically illustrates an internal configuration and peripheral configuration of a controller 100 included in the printing apparatus 1000.

Referring to FIG. 3, the controller 100 of the printing apparatus 1000 includes an external interface 110 which is a network interface for mainly connecting the controller 100 to the network 1.

The controller 100 further includes a job analysis unit 120 which analyzes a print job received via the external interface 110 and extracts information (including a page attribute) about job page control as job page control information 131. The job analysis unit 120 further extracts PDL data 140 from the print job received via the external interface 110. The job analysis unit 120 further extracts a media group definition 150 from the print job received via the external interface 110. The controller 100 further includes sheet feed stage information 160 (storage information) notified from a print engine 200 to the controller 100.

The controller 100 further includes a job control unit 130 which controls execution of the print job analyzed by the job analysis unit 120, and instructs a feed control unit 132 to start job processing. The feed control unit 132 starts job processing upon reception of the instruction from the job control unit 130, and determines a sheet feed stage (storage unit) for feeding paper from sheet feed stages 211, 212, and 213 of the print engine 200 based on the job page control information 131, the media group definition 150, and the sheet feed stage information 160.

The controller 100 further includes a renderer 141 which renders the PDL data 140 to generate image data 142, and a shipper 143 which transmits the image data 142 to the print engine 200.

The print engine 200 includes sheet feed stages a 211, b 212, and c 213 and transmits information about the sheet feed stages a 211, b 212, and c 213 to the controller 100 as the sheet feed stage information 160.

The print engine 200 feeds paper from the sheet feed stage determined by the feed control unit 132, and prints the image data 142 received from shipper 143 onto the fed paper.

A UI 300 included in the printing apparatus 1000 displays the sheet feed stage information 160 as well as job statuses and other information retained by the controller 100. The UI 300 also accepts a user input and transmits it to the controller 100.

The controller 100 is provided with hardware such as a CPU (processor), a ROM, a RAM, and an external storage unit such as an HDD and an SSD. A part of the configuration illustrated in FIG. 3 indicates functions implemented when the CPU of the controller 100 executes a relevant program computer-readably recorded in the ROM, and data computer-readably recorded in the external storage unit and the RAM.

FIGS. 4A to 4D illustrate configurations of print jobs.

FIG. 4A illustrates an exemplary configuration of a general print job 500.

The print job 500 includes at the top a job attribute 501 affecting the entire job, which is followed by a page attribute 511 of the first page and page data 512 (PDL data) of the first page. When in a print job a plurality of pages is printed, each of second and subsequent pages is also composed of a pair of a page attribute and page data.

FIGS. 4B and 4C illustrate exemplary jobs, used in a general office, having the configuration of the print job 500.

The exemplary print job illustrated in FIG. 4B specifies "no media specification", sheet feed stage AUTO, and paper size A4 as a page attribute for each page.

The exemplary print job illustrated in FIG. 4C specifies plain paper, sheet feed stage AUTO, and paper size A4 as a page attribute for each page.

FIG. 4D illustrates an exemplary job used for POD, having the configuration of the print job 500 illustrated in FIG. 4A.

The exemplary job used for POD illustrated in FIG. 4D specifies one-sided coated paper 1, sheet feed stage AUTO, and paper size A4 as a page attribute of the first page; specifies colored paper, sheet feed stage AUTO, and paper size A4 as a page attribute of the second page; and specifies "no media specification", sheet feed stage AUTO, and paper size A4 as a page attribute of the third page.

FIGS. 5A to 5D illustrate media group definitions according to a first exemplary embodiment.

Figure 5A:
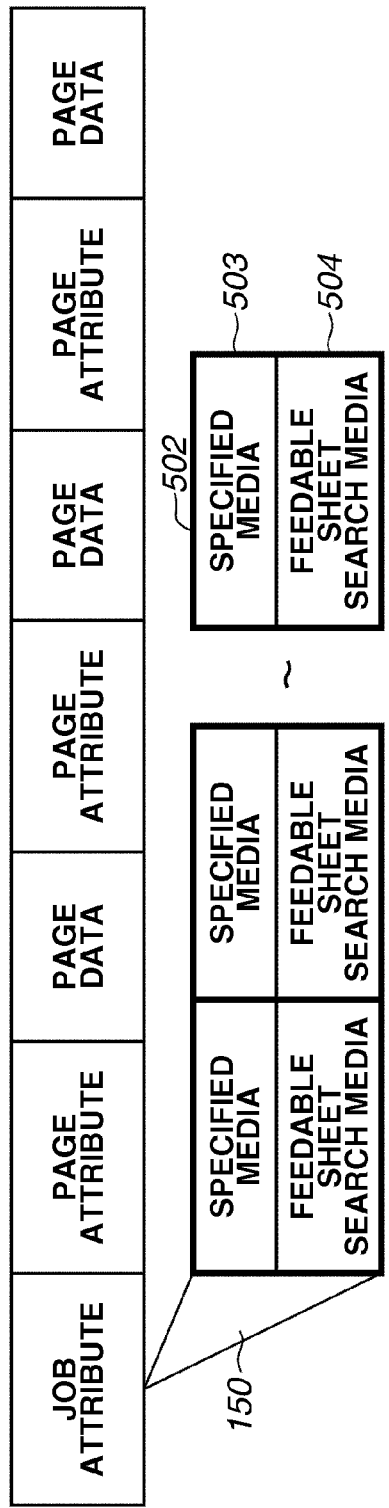

FIG. 5A illustrates an exemplary media group definition.

The media group definition 150 according to the first exemplary embodiment is a list of one or a plurality of groups 502. Each group 502 is defined as a combination of one or a plurality of specified media 503 with one or a plurality of feedable search media 504 corresponding to the specified media 503. The feedable search media 504 specify one or a plurality of media types permitted to be used when the media type specified by the specified media 503 is specified in a print job. Specifically, the media group definition 150 defines one or a plurality of combinations (groups 502) of one or a plurality of print media types (specified media 503) with one or a plurality of print media types (feedable search media 504) permitted to be used when the print media type (specified media 503) is specified in the print job.

The media group definition 150 is added to a print job as a job attribute by the printer driver 2020 of the host computers 2000, 3000, and 4000 as illustrated in FIG. 5A, and then transmitted to the printing apparatus 1000. Specifically, the printer driver 2020 of the host computers 2000, 3000, and 4000 can transmit to the printing apparatus 1000 a print job to which definition information as illustrated in FIG. 5A is added (specified) as a job attribute. Then, the printing apparatus 1000 can receive from the host computers 2000, 3000, and 4000 the print job to which definition information as illustrated in FIG. 5A is added (specified).

When the printing apparatus 1000 receives the print job, the job analysis unit 120 in the controller 100 analyzes the print job to acquire the media group definition 150 from the print job.

By using the media group definition 150 acquired from the print job, the feed control unit 132 in the controller 100 acquires a group 502 having the specified media 503 which includes media specified for each page. The feed control unit 132 further searches for a sheet feed stage storing any one of media included in the feedable search media 504 of the acquired group 502, feeds the medium from the detected sheet feed stage, and performs printing. Specifically, in the case of a group having a one-to-many or many-to-many relation between the specified media 503 and the feedable search media 504, the feed control unit 132 searches for a plurality of media. However, in the case of a group having a one-to-one relation between the specified media 503 and the feedable search media 504, the feed control unit 132 searches only for the relevant medium.

The media group definition 150 will specifically be described below with reference to FIGS. 5B to 5D.

Figure 5B:
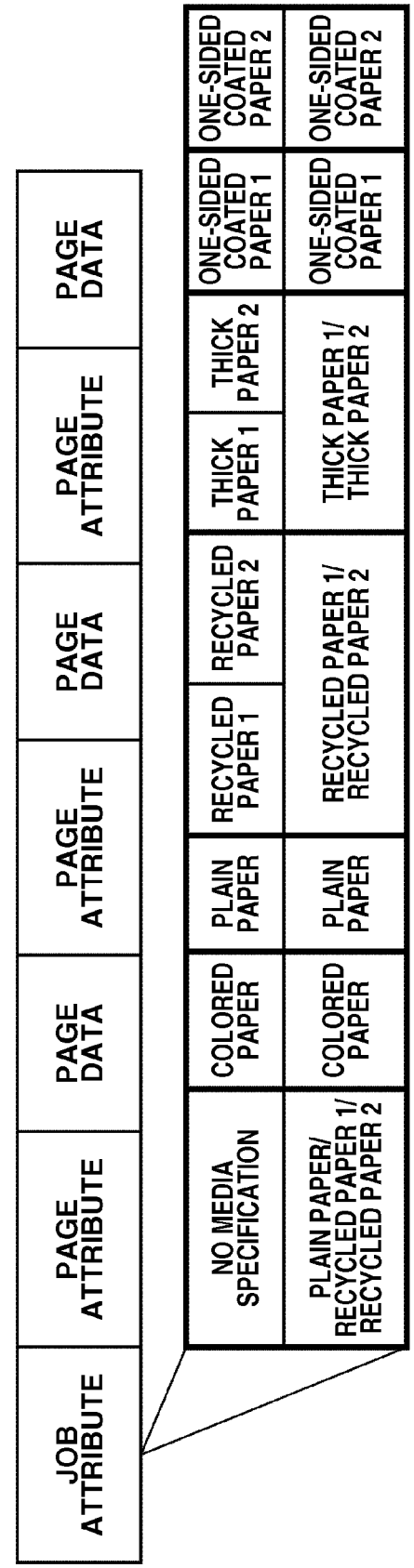

FIG. 5B illustrates an exemplary media group definition created according to the media group definition illustrated in FIG. 5A.

The media group definition illustrated in FIG. 5B is an exemplary definition for general offices having a comparatively wide search range. More specifically, the specified media 503 of this media group definition apply to comparatively many feedable search media 504.

The media group definition illustrated in FIG. 5B defines the following groups: a group specifying the feedable search media 504 of "PLAIN PAPER/RECYCLED PAPER 1/RECYCLED PAPER 2" when the specified media 503 is "NO MEDIA SPECIFICATION", a group specifying the feedable search media 504 of "COLORED PAPER" when the specified media 503 is "COLORED PAPER", a group specifying the feedable search media 504 of "PLAIN PAPER" when the specified media 503 is "PLAIN PAPER", a group specifying the feedable search media 504 of "RECYCLED PAPER 1/RECYCLED PAPER 2" when the specified media 503 is "RECYCLED PAPER 1" or "RECYCLED PAPER 2", a group specifying the feedable search media 504 of "THICK PAPER 1/THICK PAPER 2" when the specified media 503 is "THICK PAPER 1" or "THICK PAPER 2", a group specifying the feedable search media 504 of "ONE-SIDED COATED PAPER 1" when the specified media 503 is "ONE-SIDED COATED PAPER 1", and a group specifying the feedable search media 504 of "ONE-SIDED COATED PAPER 2" when the specified media 503 is "ONE-SIDED COATED PAPER 2."

For example, when the specified media 503 for a certain page in the print job is "NO MEDIA SPECIFICATION", the feed control unit 132 searches for a sheet feed stage storing any one of plain paper, recycled paper 1, and recycled paper 2, and determines to feed paper for the page from the detected sheet feed stage.

When the specified media 503 for a certain page in the print job is "RECYCLED PAPER 1" or "RECYCLED PAPER 2", the feed control unit 132 searches for a sheet feed stage storing either recycled paper 1 or recycled paper 2, and determines to feed paper for the page from the detected sheet feed stage.

When the specified media 503 for a certain page in the print job is "THICK PAPER 1" or "THICK PAPER 2", the feed control unit 132 searches for a sheet feed stage storing either thick paper 1 or thick paper 2, and determines to feed paper for the page from the detected sheet feed stage.

When the specified media 503 for a certain page in the print job is "COLORED PAPER", the feed control unit 132 searches for a sheet feed stage storing colored paper, and determines to feed paper for the page from the detected sheet feed stage. When the specified media 503 for a certain page in the print job is "PLAIN PAPER", the feed control unit 132 searches for a sheet feed stage storing plain paper, and determines to feed paper for the page from the detected sheet feed stage.

FIG. 5C illustrates an exemplary media group definition created according to the media group definition illustrated in FIG. 5A.

The media group definition illustrated in FIG. 5C is an exemplary definition for POD having a comparatively narrow search range.

The media group definition illustrated in FIG. 5C defines the following groups: a group specifying the feedable search media 504 of "PLAIN PAPER" when the specified media 503 is "NO MEDIA SPECIFICATION", a group specifying the feedable search media 504 of "PLAIN PAPER" when the specified media 503 is "PLAIN PAPER", a group specifying the feedable search media 504 of "RECYCLED PAPER 1" when the specified media 503 is "RECYCLED PAPER 1", a group specifying the feedable search media 504 of "RECYCLED PAPER 2" when the specified media 503 is "RECYCLED PAPER 2", a group specifying the feedable search media 504 of "THICK PAPER 1" when the specified media 503 is "THICK PAPER 1", a group specifying the feedable search media 504 of "THICK PAPER 2" when the specified media 503 is "THICK PAPER 2", and a group specifying the feedable search media 504 of "ONE-SIDED COATED PAPER 1/ONE-SIDED COATED PAPER 2" when the specified media 503 is "ONE-SIDED COATED PAPER 1" or "ONE-SIDED COATED PAPER 2."

For example, when the specified media 503 for a certain page in the print job is "NO MEDIA SPECIFICATION", the feed control unit 132 searches for a sheet feed stage storing plain paper, and determines to feed paper for the page from the detected sheet feed stage. When the specified media 503 for a certain page in the print job is "ONE-SIDED COATED PAPER 1" or "ONE-SIDED COATED PAPER 2", the feed control unit 132 searches for a sheet feed stage storing either one-sided coated paper 1 or one-sided coated paper 2, and determines to feed paper for the page from the detected sheet feed stage.

FIG. 5D illustrates an exemplary media group definition created according to the media group definition illustrated in FIG. 5A.

Referring to FIGS. 5B and 5C, although target media types are listed, only differences from default values of the apparatus are defined because giving each job a media group definition including all groups corresponding to all target media types will produce a large volume of data. Specifically, groups having a one-to-one relation between the specified media 503 and the feedable search media 504 will be omitted, and only groups having a one-to-many, many-to-one, or many-to-many relation between the specified media 503 and the feedable search media 504 are included in the media group definition. FIG. 5D illustrates the same media group definition as the one in FIG. 5C.

Specifically, a print job received by the printing apparatus 1000 includes the media group definition 150 and designation information. The media group definition 150 defines as one group, one or a plurality of pieces of sheet information out of sheet information for identifying a sheet usable for printing.

The designation information (the specified media 503 in the job attribute 501) specifies which group out of the plurality of groups defined by the media group definition 150 is to be used for printing.

A method for creating the media group definition file 2050 by using the media group definition application 2040 will be described below with reference to FIG. 6.

Figure 6:
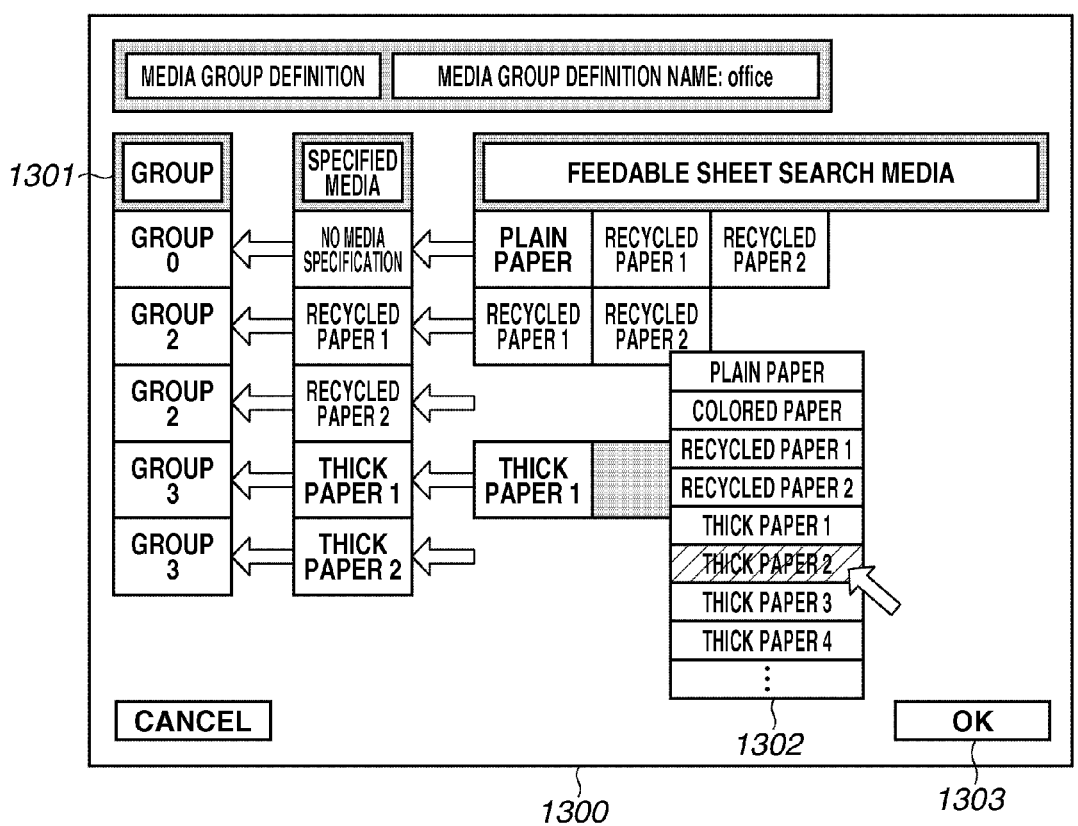
FIG. 6 illustrates an exemplary screen displayed on a user interface (UI) of a media group definition application for creating a media group definition file.

FIG. 6 illustrates an exemplary screen displayed on the UI 2001 of the media group definition application 2040 for creating the media group definition file 2050.

The UI screen illustrated in FIG. 6 is displayed on the UI 2001 by the media group definition application 2040 of the host computers 2000, 3000, and 4000. Specifically, a UI screen 1300 illustrated in FIG. 6 is displayed on the UI 2001 when the CPU of the host computers 2000, 3000, and 4000 executes the media group definition application 2040 computer-readably recorded in the external storage unit. A method for performing media group definition from the UI screen 1300 in FIG. 6 will be described.

First of all, a user clicks "GROUP" 1301 on the UI 2001 to display a menu and then performs an operation for adding a group from the menu. In this case, the user performs an operation for inputting a group number on the UI 2001. With these operations, the media group definition application 2040 adds a new group to the UI screen 1300.

Then, the user clicks the added group on the UI 2001 to display a menu and then performs an operation for adding "SPECIFIED MEDIA" from the menu. In this case, the user performs an operation for selecting a media type (print media type). With these operations, the media group definition application 2040 adds the specified media to the group. The user performs the above-mentioned operations a plurality of times to add a plurality of specified media to one group. In this case, a group of the same number is added to the UI screen 1300 and then the specified media are added to the added group.

Then, the user clicks the added specified media on the UI 2001 to display a menu 1302 and then performs an operation for adding "FEEDABLE SEARCH MEDIA" from the menu 1302. In this case, the user performs an operation for selecting the media type on the UI 2001. With these operations, the media group definition application 2040 adds the feedable search media corresponding to the specified media. By performing this operation a plurality of times, a plurality of feedable search media can be added to one specified medium.

When the user clicks an OK button 1303 on the UI 2001, the media group definition application 2040 generates the media group definition file 2050 on the external storage unit based on the media group definition information created on the UI screen 1300.

Job processing by the feed control unit 132 according to the first exemplary embodiment will be described below with reference to FIG. 7.

Figure 7:
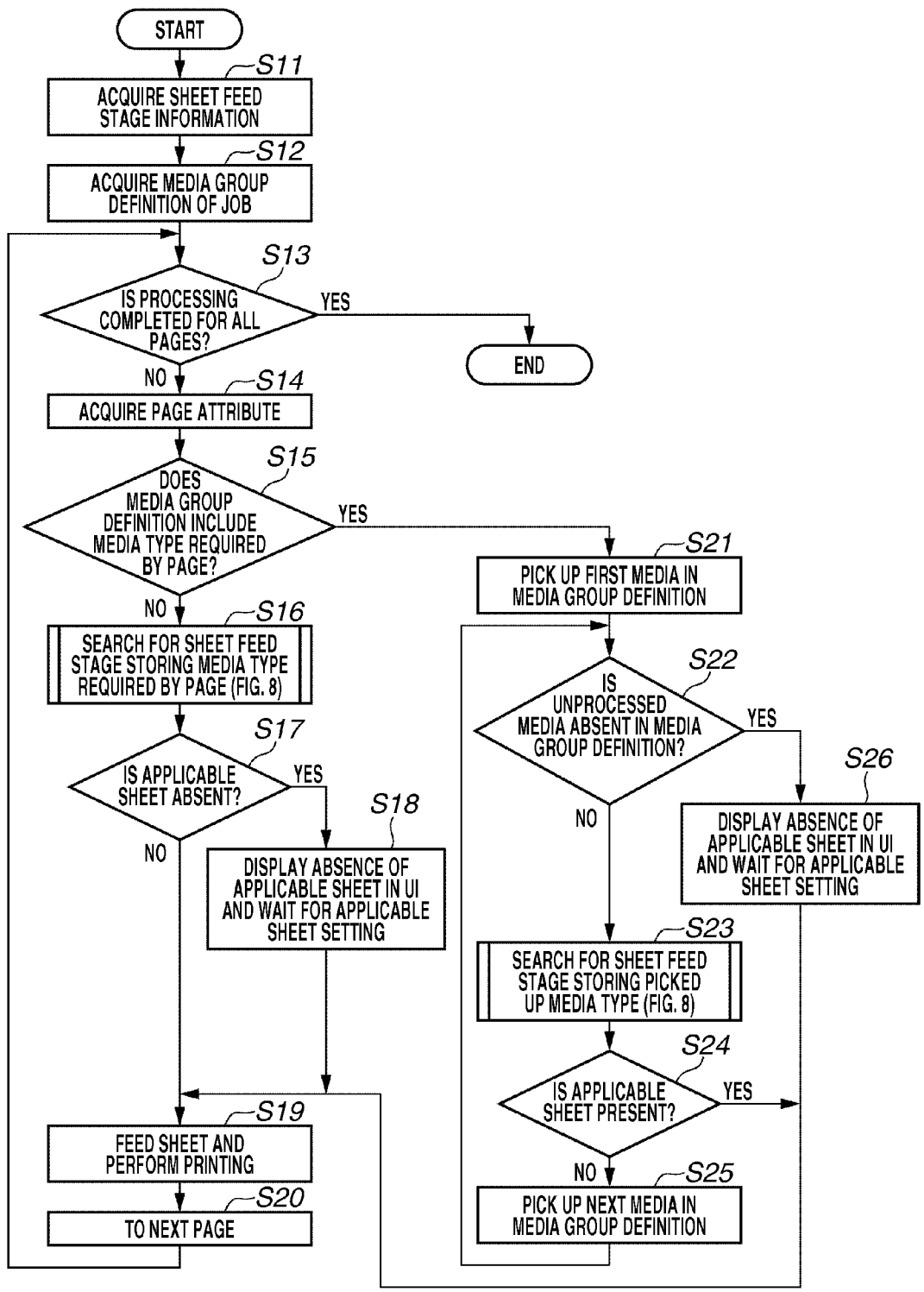
FIG. 7 is a flow chart illustrating exemplary job processing by a feed control unit in the controller of the printing apparatus according to a second exemplary embodiment.

FIG. 7 is a flow chart illustrating exemplary job processing by the feed control unit 132 in the controller 100 of the printing apparatus 1000 according to the first exemplary embodiment. Processing of this flow chart is executed by the feed control unit 132 in the controller 100 of the printing apparatus 1000. For example, a part of the configuration of the controller 100 of the printing apparatus 1000 is implemented when the CPU of the controller 100 executes a relevant program computer-readably recorded in the ROM.

When the controller 100 receives a print job from the host computer 2000 via the network 1, the job analysis unit 120 in the controller 100 analyzes the print job to split data into the PDL data 140, the job page control information 131, and the media group definition 150. Then, the feed control unit 132 starts job processing upon reception of an instruction from the job control unit 130. The PDL data 140 is asynchronously rendered by the renderer 141 and then accumulated as the image data 142.

After starting job processing, in step S11, the feed control unit 132 acquires from the sheet feed stage information 160 information about the sheet feed stages a 211, b 212, and c 213 of the print engine 200 (sheet feed stage information acquisition processing).

In step S12, the feed control unit 132 acquires the media group definition 150 (media group definition information acquisition processing), and the processing proceeds to step S13.

In step S13, the feed control unit 132 determines whether processing is completed for all pages of the print job. When the feed control unit 132 determines that processing is not completed for all pages (NO in step S13), the processing proceeds to step S14.

In step S14, the feed control unit 132 acquires a page attribute of the first unprocessed page from the job page control information 131.

In step S15, the feed control unit 132 determines whether the specified media 503 in the media group definition 150 includes the media type specified in the page attribute acquired in step S14.

When the feed control unit 132 determines that the specified media 503 in the media group definition 150 does not include the media type specified in the page attribute (NO in step S15), the processing proceeds to step S16.

In step S16, the feed control unit 132 searches for a sheet feed stage of the print engine 200 storing paper of the sheet size and media type specified in the page attribute (sheet feed stage search processing). The sheet feed stage search processing is illustrated in detail in FIG. 8.

When the feed control unit 132 determines that none of the sheet feed stages of the print engine 200 stores paper of the sheet size and media type specified in the page attribute (a search result of "applicable paper absent": YES in step S17), the processing proceeds to step S18.

In step S18, the feed control unit 132 displays on the UI 300 the absence of paper specified in the page attribute, and then waits until paper of the applicable media type is set in the print engine 200. When paper of the applicable media type is set in the sheet feed stage a 211, b 212, or c 213, the print engine 200 updates the sheet feed stage information 160.

Upon detection, from the sheet feed stage information 160, that paper of the applicable media type has been set in one of the sheet feed stages of the print engine 200, the feed control unit 132 determines to feed paper from the sheet feed stage. In step S19, the feed control unit 132 instructs the print engine 200 to feed paper from the sheet feed stage, and the print engine 200 performs printing on the paper in synchronization with the shipper 143.

When the feed control unit 132 determines that one of the sheet feed stages of the print engine 200 stores paper of the sheet size and media type specified in the page attribute (a search result of "applicable paper present": NO in step S17), the processing proceeds to step S19. In step S19, the feed control unit 132 determines to feed paper from the sheet feed stage storing the specified paper detected in step S16. The feed control unit 132 instructs the print engine 200 to feed paper from the sheet feed stage, and the print engine 200 performs printing onto the paper in synchronization with the shipper 143.

When a sheet feed stage is specified in the page attribute, the feed control unit 132 determines whether paper of the sheet size and media type specified in the page attribute is set in the specified sheet feed stage, instead of performing the processing in step S16. When the feed control unit 132 determines that paper of the sheet size and media type specified in the page attribute is not set in the sheet feed stage (YES in step S17), the processing proceeds to step S18. When the feed control unit 132 determines that paper of the sheet size and media type specified in the page attribute is set in the sheet feed stage (NO in step S17), the processing proceeds to step S19.

When print processing in step S19 is completed, the processing proceeds to step S20 and then returns to step S13.

When the feed control unit 132 determines that the specified media 503 in the media group definition 150 includes the media type specified in the page attribute (YES in step S15), the processing proceeds to step S21.

In step S21, the feed control unit 132 performs processing for picking up the first media in the feedable search media 504 corresponding to the specified media 503 corresponding to the media type specified in the page attribute (media acquisition processing), the processing proceeds to step S22. For example, with the media group definition 150 in FIG. 5B, when the media type specified in the page attribute is "NO MEDIA SPECIFICATION", the feed control unit 132 acquires "PLAIN PAPER" as the first media.

In step S22, the feed control unit 132 determines whether a medium cannot be picked up (there is no more unprocessed medium in the feedable search media 504 corresponding to the media type specified in the page attribute). When the feed control unit 132 determines that a medium can be picked up (there is an unprocessed medium in the feedable search media 504 corresponding to the media type specified in the page attribute: NO in step S22), the processing proceeds to step S23.

In step S23, the feed control unit 132 searches for a sheet feed stage of the print engine 200 storing paper of the picked up media type having the paper size specified in the page attribute (sheet feed stage search processing). The sheet feed stage search processing is illustrated in detail in FIG. 8.

When the feed control unit 132 determines that paper of the picked up media type having the paper size specified in the page attribute is not set in any sheet feed stages of the print engine 200 (a search result of "applicable paper absent": NO in step S24), the processing proceeds to step S25. In step S25, the feed control unit 132 performs processing for picking up the next media in the feedable search media 504 corresponding to the specified media 503 corresponding to the media type specified in the page attribute (media acquisition processing), and the processing returns to step S22.

When the feed control unit 132 determines that paper of the picked up media type having the paper size specified in the page attribute is set in one of the sheet feed stages of the print engine 200 (a search result of "applicable paper present": YES in step S24), the processing proceeds to step S19. In step S19, the feed control unit 132 determines to feed paper from the sheet feed stage storing the specified paper detected in step S23. Then, the feed control unit 132 instructs the print engine 200 to feed paper from the sheet feed stage, and the print engine 200 performs printing onto the paper in synchronization with the shipper 143. Subsequent processing is similar to the above-mentioned one, and duplicated explanation will be omitted.

When the feed control unit 132 determines that a medium cannot be picked up (there is no more unprocessed medium in the feedable search media 504 corresponding to the media type specified in the page attribute: YES in step S22), the processing proceeds to step S26.

In step S26, the feed control unit 132 displays on the UI 300 the absence of paper specified in the page attribute, and then waits until paper of the applicable media type is set in the print engine 200. When paper of the applicable media type is set in the sheet feed stage a 211, b 212, or c 213, the print engine 200 updates the sheet feed stage information 160. Upon detection, from the sheet feed stage information 160, that paper of the applicable media type has been set in one of the sheet feed stages of the print engine 200, the feed control unit 132 determines to feed paper from the sheet feed stage. In step S19, the feed control unit 132 instructs the print engine 200 to feed paper from the sheet feed stage, and the print engine 200 performs printing onto the paper in synchronization with the shipper 143. Subsequent processing is similar to the above-mentioned one, and duplicated explanation will be omitted.

In step S13, when the feed control unit 132 determines that processing is completed for all pages of the print job (YES in step S13), the processing of this flow chart ends.

To simplify the explanation of this flow chart, processing for canceling a print job when paper is absent and the apparatus stops, and processing for using an alternative paper size will be omitted.

The sheet feed stage search processing in steps S16 and S23 in the flow chart in FIG. 7 will be described blow with reference to FIG. 8.

Figure 8:
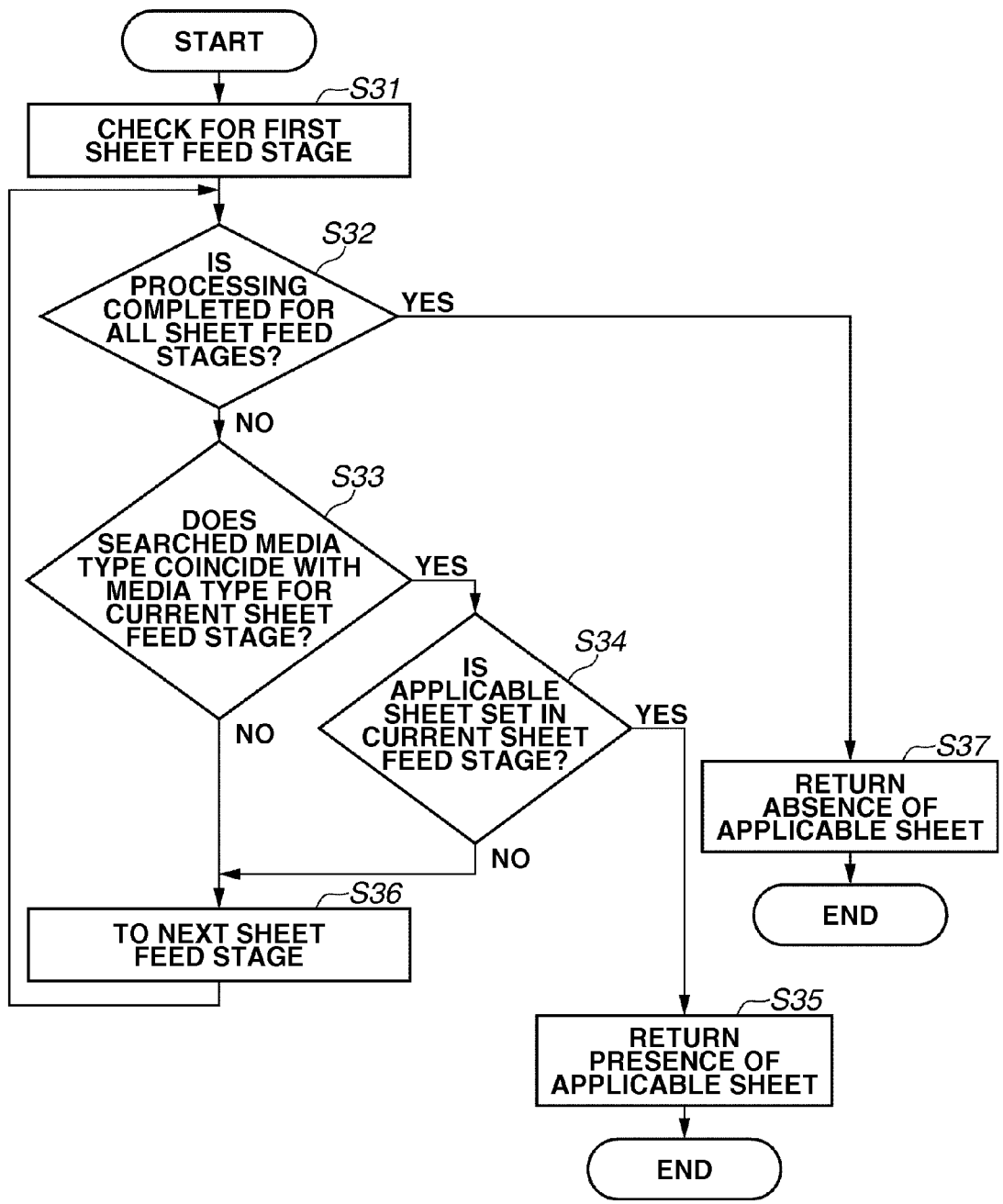
FIG. 8 is a flow chart illustrating exemplary sheet feed stage search processing (steps S16 and S22 in FIG. 7) by the feed control unit of the controller of the printing apparatus.

FIG. 8 is a flow chart illustrating exemplary sheet feed stage search processing (in steps S16 and S23 in FIG. 7) by the feed control unit 132 in the controller 100 of the printing apparatus 1000.

After starting the sheet feed stage search processing, in step S31, the feed control unit 132 checks the first sheet feed stage (performs processing for setting the first sheet feed stage a 211 as the current sheet feed stage).

In step S32, the feed control unit 132 determines whether processing is completed for all sheet feed stages (whether there is no more unprocessed sheet feed stage to be set as the current sheet feed stage). When the feed control unit 132 determines that processing is not completed for all sheet feed stages (NO in step S32), the processing proceeds to step S33.

In step S33, the feed control unit 132 determines whether the sheet size and media type of the paper set in the current sheet feed stage coincide with the sheet size and media type currently being searched for.

When the feed control unit 132 determines that the sheet size and media type of the paper set in the current sheet feed stage coincide with the sheet size and media type currently being searched for (YES in step S33), the processing proceeds to step S34.

In step S34, the feed control unit 132 determines whether applicable paper is present in the current sheet feed stage. When the feed control unit 132 determines that applicable paper is present in the current sheet feed stage (YES in step S34), the processing proceeds to step S35. In step S35, the feed control unit 132 returns a search result of "applicable paper present", and the processing returns to the flow chart in FIG. 7.

When the feed control unit 132 determines that applicable paper is absent in the current sheet feed stage (NO in step S34), the processing proceeds to step S36.

When the feed control unit 132 determines that the sheet size and media type of the paper set in the current sheet feed stage do not coincide with the sheet size and media type currently being searched for (NO in step S33), the processing proceeds to step S36.

In step S36, the feed control unit 132 performs processing for setting the next sheet feed stage as the current sheet feed stage, and the processing returns to step S32.

In step S32, the feed control unit 132 determines whether processing is completed for all sheet feed stages (whether there is no more unprocessed sheet feed stage to be set as the current sheet feed stage). When the feed control unit 132 determines that processing is completed for all sheet feed stages (YES in step S32), the processing proceeds to step S37. In step 37, the feed control unit 132 returns a search result of "applicable paper absent", and the processing returns to the flow chart in FIG. 7.

Effects of the first exemplary embodiment will specifically be described below.

As a first example, suppose that an office user wants to quickly print many pages onto any one of recycled paper or plain paper, and transmits his or her own print job from the host computer 2000 to the printing apparatus 1000. In this case, the user attaches the media group definition illustrated in FIG. 5B to the print job by using the printer driver 2020. The printing apparatus 1000 searches for a sheet feed stage of the print engine 200 storing plain paper, feeds plain paper from the detected sheet feed stage, and then starts printing. Even when paper of the sheet feed stage runs out, the printing apparatus 1000 can continue print processing by changing the current sheet feed stage to any other sheet feed stages storing recycled paper 1 or recycled paper 2. In this case, if other sheet feed stages store paper other than recycled paper 1 and recycled paper 2 (for example, colored paper, thick paper, coated paper, etc.), paper is not fed from these sheet feed stages, thus preventing printing on paper not intended by the user. Thus, even when paper of the media type specified by a print job runs out, the printing system according to the first exemplary embodiment can reduce as much as possible user's work for replacing paper and forcibly changing the current sheet feed stage, thus minimizing user's trouble. Further, it is not necessary to set paper having the same paper attribute in a plurality of sheet feed stages, enabling efficient use of limited number of sheet feed stages.

As a second example, suppose that the user wants to output a print product including pages of coated paper (one-sided coated paper 1 or one-sided coated paper 2). In this case, since the user knows that only one-sided coated paper 1 is currently set in a dedicated POD apparatus, the user generates a print job specifying one-sided coated PAPER 1. However, afterward, the user knows that the dedicated POD apparatus is executing other print job and cannot be used for the time being, and accordingly decides to perform printing on the printing apparatus 1000 which is a backup LitePOD apparatus. Then, when transmitting the print job to the printing apparatus 1000, the user attaches the media group definition illustrated in FIG. 5C to the print job by using the printer driver 2020. Even if the printing apparatus 1000 supports only one-sided coated paper 2 but does not support one-sided coated PAPER 1, the printing apparatus 1000 can perform printing after detecting a sheet feed stage storing one-sided coated paper 2. Thus, even if paper of the media type specified in the job attribute is absent in the printing apparatus 1000, the printing apparatus 1000 according to the first exemplary embodiment can control media under automatic sheet feed changeover to prevent error occurrence and printing onto unintended paper. Further, even if the media type is not specified in the job attribute, the printing apparatus 1000 according to the first exemplary embodiment can feed paper out of the media specified for "NO MEDIA SPECIFICATION" in the media group definition by the user, and perform printing.

If the user operates the printing apparatus 100 only for office use, making and fixing the setting once by using the printer driver 2020 saves subsequent time and effort. In this case, the user only needs to select a media group definition when entering a print job. Further, by preparing typical patterns for avoiding cases which are likely to cause a problem and selecting a suitable pattern according to purpose, reassigning a print job from a dedicated POD apparatus to a LitePOD apparatus does not need much time and effort. This enables a single printing apparatus 1000 to function as both a high-speed office apparatus and a POD apparatus.

From the viewpoint of recycling, if the user wants to flexibly change paper on a job basis, for example, recycled paper for draft printing and plain paper (and one-sided coated paper 1 for some pages) for documents for external use, the user only needs to change a media group definition to be added to a print job on a job basis.

Therefore, the printing apparatus 1000 according to the first exemplary embodiment is capable of preventing printing on media not intended by the user and performing printing on media permitted by the user even if media specified by a print job is not set in a sheet feed stage of the printing apparatus 1000 or if no medium is specified in the print job.

In the above-mentioned first exemplary embodiment, if every page requires the same paper size and media type, every page permits the same media type. In some cases, however, it may be preferable to use different media for different page attributes, for example, for each of color and monochrome pages. For example, in some cases, a user accepts both one-sided coated paper 1 and one-sided coated paper 2 for monochrome pages, and wants to strictly differentiate between one-sided coated paper 1 and one-sided coated paper 2 for color pages. A configuration for meeting such a demand will be described below as a second exemplary embodiment.

In the second exemplary embodiment, configurations of the printing system, host computers, printing apparatus, and print job are similar to those in the first exemplary embodiment illustrated in FIGS. 1 to 4, and duplicated explanation will be omitted.

Figure 9:
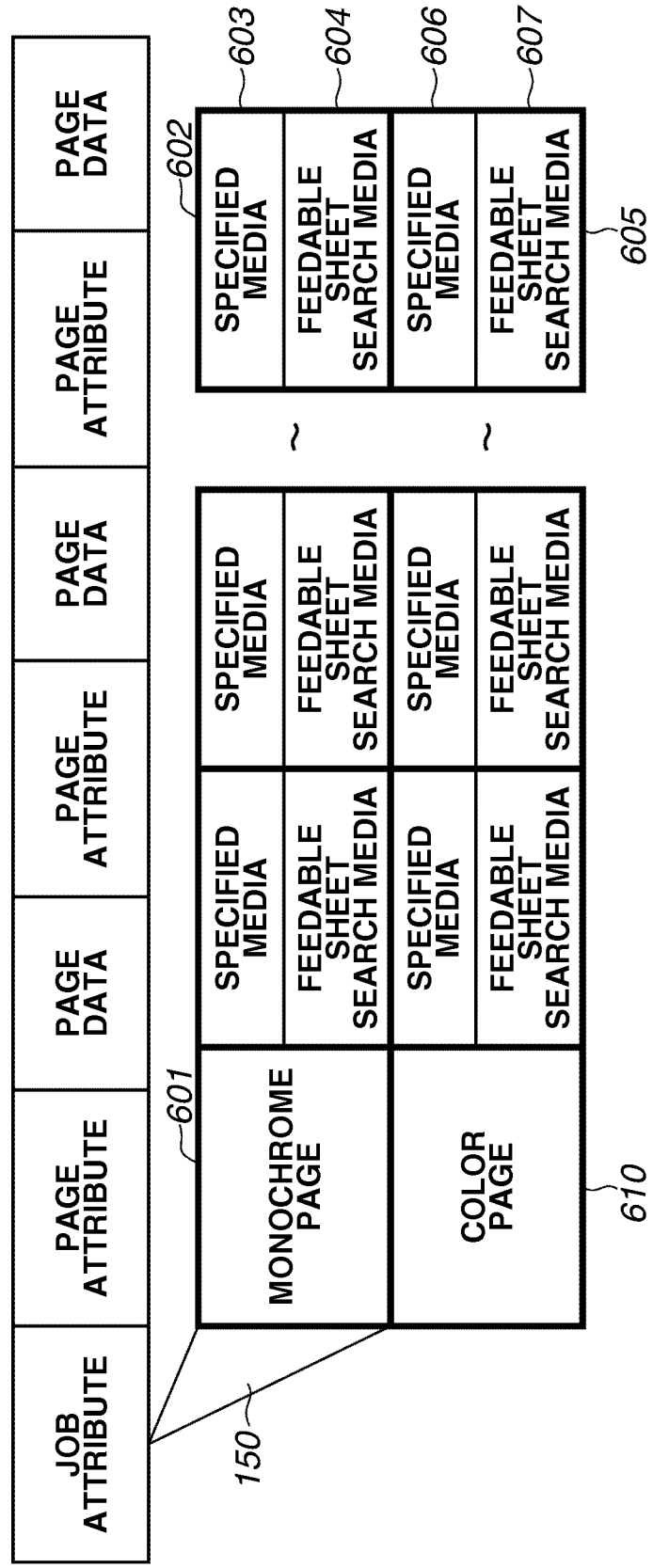
FIG. 9 illustrates a media group definition according to the second exemplary embodiment.

FIGS. 9 and 10 illustrate media group definitions according to the second exemplary embodiment.

FIG. 9 illustrates an exemplary media group definition.

A media group definition 150 according to the second exemplary embodiment includes a media group definition 601 for monochrome pages which is definition information for monochrome printing, and a media group definition 610 for color pages which is definition information for color printing.

The media group definition 601 for monochrome pages is a list of one or a plurality of groups 602. Each group 602 is defined as a combination of one or a plurality of specified media 603 with one or a plurality of feedable search media 604 corresponding to the specified media 603.

The media group definition 610 for color pages is a list of one or a plurality of groups 605. Each group 605 is defined as a combination of one or a plurality of specified media 606 with one or a plurality of feedable search media 607 corresponding to the specified media 606.

The group 602 for monochrome pages and the group 605 for color pages may not have correlation.

The media group definition 150 is added to a print job as a job attribute by the printer driver 2020 of the host computers 2000, 3000, and 4000 as illustrated in FIG. 9, and then transmitted to the printing apparatus 1000. When the printing apparatus 1000 receives the print job, the job analysis unit 120 in the controller 100 analyzes the print job to acquire the media group definition 150 from the print job.

The media group definition 150 illustrated in FIG. 9 will specifically be described in below with reference to FIG. 10.

FIG. 10 illustrates an exemplary media group definition created according to the media group definition illustrated in FIG. 9.

The media group definition 601 for monochrome pages illustrated in FIG. 10 defines the following groups: a group specifying the feedable search media 604 of "PLAIN PAPER/RECYCLED PAPER 1/RECYCLED PAPER 2" when the specified media 603 is "NO MEDIA SPECIFICATION", a group specifying the feedable search media 604 of "COLORED PAPER" when the specified media 603 is "COLORED PAPER", a group specifying the feedable search media 604 of "PLAIN PAPER" when the specified media 603 is "PLAIN PAPER", a group specifying the feedable search media 604 of "RECYCLED PAPER 1/RECYCLED PAPER 2" when the specified media 603 is "RECYCLED PAPER 1" or "RECYCLED PAPER 2", a group specifying the feedable search media 604 of "THICK PAPER 1/THICK PAPER 2" when the specified media 603 is "THICK PAPER 1" or "THICK PAPER 2", and a group specifying the feedable search media 604 of "ONE-SIDED COATED PAPER 1/ONE-SIDED COATED PAPER 2" when the specified media 603 is "ONE-SIDED COATED PAPER 1" or "ONE-SIDED COATED PAPER 2."

The media group definition 610 for color pages illustrated in FIG. 10 defines the following groups: a group specifying the feedable search media 607 of "PLAIN PAPER" when the specified media 606 is "NO MEDIA SPECIFICATION", a group specifying the feedable search media 607 of "COLORED PAPER" when the specified media 606 is "COLORED PAPER", a group specifying the feedable search media 607 of "PLAIN PAPER" when the specified media 606 is "PLAIN PAPER", a group specifying the feedable search media 607 of "RECYCLED PAPER 1/RECYCLED PAPER 2" when the specified media 606 is "RECYCLED PAPER 1" or "RECYCLED PAPER 2", a group specifying the feedable search media 607 of "THICK PAPER 1" when the specified media 606 is "THICK PAPER 1", a group specifying the feedable search media 607 of "THICK PAPER 2" when the specified media 606 is "THICK PAPER 2", a group specifying the feedable search media 607 of "ONE-SIDED COATED PAPER 1" when the specified media 606 is "ONE-SIDED COATED PAPER 1", and a group specifying the feedable search media 607 of "ONE-SIDED COATED PAPER 2" when the specified media 606 is "ONE-SIDED COATED PAPER 2."

For example, when the specified media 603 for a certain monochrome page in the print job is "NO MEDIA SPECIFICATION", the feed control unit 132 searches for a sheet feed stage storing any one of plain paper, recycled PAPER 1, and recycled paper 2, and determines to feed paper for the page from the detected sheet feed stage. When the specified media 606 for a certain color page is "NO MEDIA SPECIFICATION", the feed control unit 132 searches for a sheet feed stage storing plain paper, and determines to feed paper for the page from the detected sheet feed stage.

When the specified media 603/606 for a certain monochrome or color page in the print job is "RECYCLED PAPER 1" or "RECYCLED PAPER 2", the feed control unit 132 searches for a sheet feed stage storing either recycled paper 1 or recycled paper 2, and determines to feed paper for the page from the detected sheet feed stage.

When the specified media 603 for a certain monochrome page in the print job is "THICK PAPER 1", the feed control unit 132 searches for a sheet feed stage storing either thick paper 1 or thick paper 2, and determines to feed paper for the page from the detected sheet feed stage. When the specified media 606 for a certain color page is "THICK PAPER 1", the feed control unit 132 searches for a sheet feed stage storing thick paper 1, and determines to feed paper for the page from the detected sheet feed stage. This also applies to a case of thick paper 2.

When the specified media 603 for a certain monochrome page in the print job is "ONE-SIDED COATED PAPER 1", the feed control unit 132 searches for a sheet feed stage storing either one-sided coated paper 1 or one-sided coated paper 2, and determines to feed paper for the page from the detected sheet feed stage. When the specified media 606 for a certain color page is "ONE-SIDED COATED PAPER 1", the feed control unit 132 searches for a sheet feed stage storing one-sided coated paper 1, and determines to feed paper for the page from the detected sheet feed stage. This also applies to a case of one-sided coated paper 2.

When the specified media 603/606 for a certain monochrome or color page in the print job is "COLORED PAPER", the feed control unit 132 searches for a sheet feed stage storing colored paper, and determines to feed paper for the page from the detected sheet feed stage. This also applies to a case of plain paper.

Specifically, with the example of the media group definition illustrated in FIG. 10, the user uses media types in different ways. In the case of monochrome pages, the user accepts both recycled paper 1 and recycled paper 2, both thick paper 1 and thick paper 2, and both one-sided coated paper 1 and one-sided coated paper 2. In the case of color pages, the user accepts both recycled paper 1 and recycled paper 2, and wants to strictly differentiate between thick paper 1 and thick paper 2 and between one-sided coated paper 1 and one-sided coated paper 2.

The UI screen of the media group definition application 2040 for creating the media group definition file 2050 according to the second exemplary embodiment is created based on the UI screen 1300 illustrated in FIG. 6 activated for monochrome pages and color pages.

Job processing by the feed control unit 132 according to the second exemplary embodiment will be described below with reference to FIG. 11.

Figure 11:
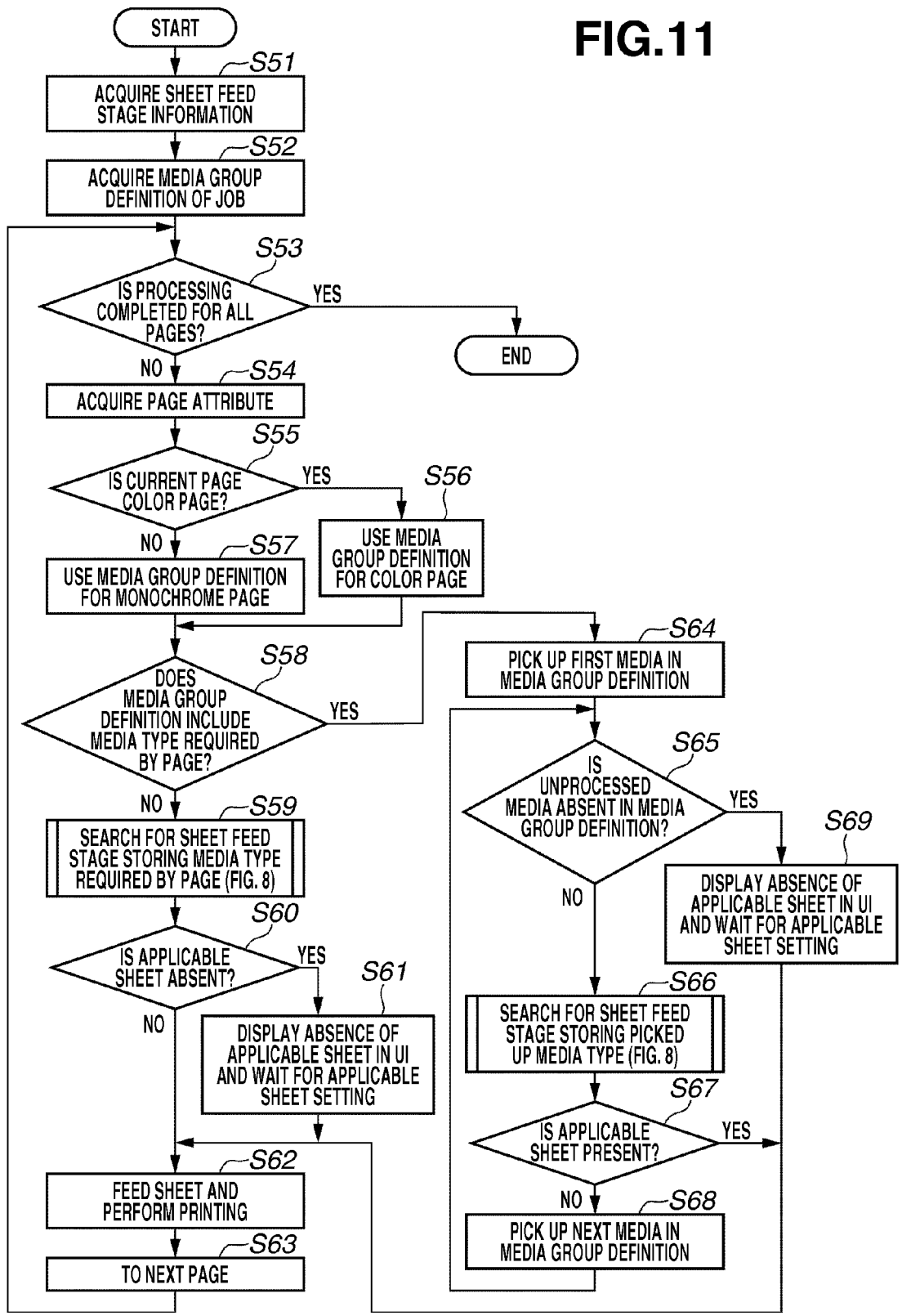
FIG. 11 is a flow chart illustrating exemplary job processing by the feed control unit of the controller of the printing apparatus according to the second exemplary embodiment.

FIG. 11 is a flow chart illustrating exemplary job processing by the feed control unit 132 in the controller 100 of the printing apparatus 1000 according to the second exemplary embodiment. Processing of this flow chart is executed by the feed control unit 132 in the controller 100 of the printing apparatus 1000. For example, a part of the configuration of the controller 100 of the printing apparatus 1000 is implemented when the CPU of the controller 100 executes a relevant program computer-readably recorded in the ROM.

When the controller 100 receives a print job from the host computer 2000 via the network 1, the job analysis unit 120 in the controller 100 analyzes the print job to split data into the PDL data 140, the job page control information 131, and the media group definition 150. Then, the feed control unit 132 starts job processing upon reception of an instruction from the job control unit 130. The PDL data 140 is asynchronously rendered by the renderer 141 and then accumulated as the image data 142. The job page control information 131 includes information for determining whether each page is a monochrome page or a color page.

After starting job processing, in step S51, the feed control unit 132 acquires from the sheet feed stage information 160 information about the sheet feed stages a 211, b 212, and c 213 of the print engine 200.

In step S52, the feed control unit 132 acquires the media group definition 150, and the processing proceeds to step S53.

In step S53, the feed control unit 132 determines whether processing is completed for all pages of the print job. When the feed control unit 132 determines that processing is not completed for all pages (NO in step S53), the processing proceeds to step S54.

In step S54, the feed control unit 132 sets the first unprocessed page as the current page based on the job page control information 131, and acquires the page attribute of the current page and information for determining whether the current page is a monochrome page or a color page.

In step S55, the feed control unit 132 determines whether the current page is a color page or a monochrome page based on the information acquired in step S54.

When the feed control unit 132 determines that the current page is a color page (YES in step S55), the processing proceeds to step S56. In step S56, the feed control unit 132 determines to execute processing in steps S58 to S69 by using the media group definition 610 for color pages as a media group definition.

When the feed control unit 132 determines that the current page is a monochrome page (NO in step S55), the processing proceeds to step S57. In step S57, the feed control unit 132 determines to execute processing in steps S58 to S69 by using the media group definition 610 for monochrome pages as a media group definition.

Subsequent processing in steps S58 to S69 is similar to that in steps S15 to S26 in FIG. 7, and duplicated explanation will be omitted.

When the feed control unit 132 determines that processing is completed for all pages of the print job (YES in step S53), the processing of this flow chart ends.

To simplify the explanation of this flow chart, processing for canceling a print job when paper is absent and the apparatus stops, and processing for using an alternative paper size will be omitted.

In addition to the above-mentioned effects of the first exemplary embodiment, the second exemplary embodiment deals with a case where the user accepts both one-sided coated paper 1 and one-sided coated paper 2 for monochrome pages, and wants to strictly differentiate between one-sided coated paper 1 and one-sided coated paper 2 for color pages, thus flexibly determining a sheet feed stage.

Although, in the second exemplary embodiment, a dedicated media group definition is used for each page attribute (a dedicated media group definition is used for each of color and monochrome pages), a dedicated media group definition may be used for each of color page, monochrome page, and other page attributes.

For example, according to a page attribute of text page, photograph page, or text and photograph page, the user may use a media group definition file including a media group definition for text page, photograph page, or text and photograph page, respectively.

In the case of a printing apparatus capable of overlapping a special printing agent (clear toner) for glossiness adjustment for making a print product glossy, with a colored printing agent (colored toner), according to a page attribute of clear coat page using clear toner or non-clear coat page not using clear toner, the user may use a media group definition file including a media group definition for clear coat page or non-clear coat page, respectively.

A third exemplary embodiment applicable to a plurality of media group definition formats will be described below. For example, the third exemplary embodiment is applicable to both a media group definition having the format in the first exemplary embodiment (first format) illustrated in FIG. 5A and a media group definition having the format in the second exemplary embodiment (second format) illustrated in FIG. 9.

Differences between the first and second exemplary embodiments will be described below.

Job processing by the feed control unit 132 according to the third exemplary embodiment will be described below with reference to FIG. 12.

Figure 12:
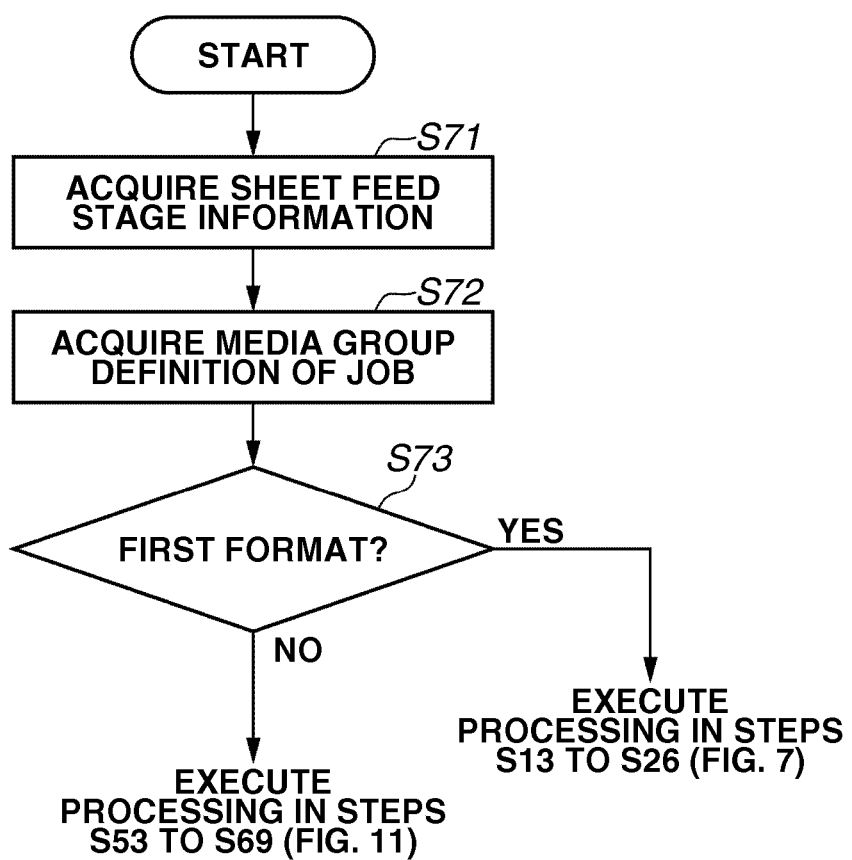
FIG. 12 is a flow chart illustrating exemplary job processing by the feed control unit of the controller of the printing apparatus according to a third exemplary embodiment.

FIG. 12 is a flow chart illustrating exemplary job processing by the feed control unit 132 in the controller 100 of the printing apparatus 1000 according to the third exemplary embodiment. Processing of this flow chart is executed by the feed control unit 132 in the controller 100 of the printing apparatus 1000. For example, a part of the configuration of the controller 100 of the printing apparatus 1000 is implemented when the CPU of the controller 100 executes a relevant program computer-readably recorded in the ROM.

When the controller 100 receives a print job from the host computer 2000 via the network 1, the job analysis unit 120 in the controller 100 analyzes the print job to split data into the PDL data 140, the job page control information 131, and the media group definition 150. Then, the feed control unit 132 starts job processing upon reception of an instruction from the job control unit 130.

After starting job processing, in step S71, the feed control unit 132 acquires from the sheet feed stage information 160 information about the sheet feed stages a 211, b 212, and c 213 of the print engine 200.

In step S72, the feed control unit 132 acquires the media group definition 150, and the processing proceeds to step S73.

In step S73, the feed control unit 132 determines whether the media group definition 150 acquired in step S72 has the first or second format.

Then, when the feed control unit 132 determines that the media group definition 150 has the first format (YES in step S72), the feed control unit 132 executes processing in steps S13 to S26 in FIG. 7.

When the feed control unit 132 determines that the media group definition 150 has the second format (NO in step S72), the feed control unit 132 executes processing in steps S53 to S69 in FIG. 11.

As illustrated above, the user uses media group definitions of a plurality of formats to enable flexibly determining a sheet feed stage depending on situations.

Other Embodiments

Although, in the above-mentioned exemplary embodiments, the user instructs a printer driver UI to add a media group definition to a print job and transmit it to the printing apparatus, a predetermined media group definition may be constantly transmitted to the printing apparatus.

Further, a media group definition predetermined for each user may be transmitted to the printing apparatus.

When a plurality of media is included in the feedable search media 504 of the media group definition 150 (media types specified in the page attribute coincide with the specified media 503), the user selects media with the following predetermined method. For example, media corresponding to media types specified in a print job maybe searched for in the feedable search media 504 (that is, a sheet feed stage is determined) in a defined order or based on a priority assigned in advance to each medium in the feedable search media 504.

Further, media types specified in a print job may be preferentially searched for (that is, a sheet feed stage is preferentially determined).

Further, for example, even when a media group definition specifying the feedable search media 504 of "PLAIN PAPER" when the specified media 503 is "NO MEDIA SPECIFICATION" is preset in the printing apparatus 1000, a media group definition specified in the print job may be given a priority. This improves the convenience for a user who wants to use an original media group definition instead of the media group definition preset in the printing apparatus 1000.

Although, in the above-mentioned exemplary embodiments, print media types are defined as a media group definition, the present invention is not limited thereto. For example, information for identifying print media (sheets) to be used for printing, such as the size of print media, may be defined as groups like the media group definitions in FIGS. 5A to 5D, and any one of the defined groups to be used may be specified by the page attribute 511.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-216538 filed Sep. 28, 2010, which is hereby incorporated by reference herein in its entirety.

What is claimed is:

1. A printing system comprising:
an information processing apparatus; and
a printing apparatus,
wherein the information processing apparatus comprises:
a generating unit configured to generate a definition file defining a plurality of types of sheet that the printing apparatus can use, in a case where a type of sheet to be used for printing is not specified, for printing; and
a transmitting unit configured to transmit to the printing apparatus a print job to which the definition file has been added, and
wherein the printing apparatus comprises:
a receiving unit configured to receive a print job to which the definition file has been added;
a selecting unit configured to select, in a case where a type of sheet to be used for printing is not specified in the print job, a type of sheet to be used for printing from among the plurality of types of sheet defined by the definition file added to the print job;
a printing unit configured to perform printing using the type of sheet selected by the selecting unit; and
a notifying unit configured to notify, in a case where a type of sheet to be used for printing is not specified in the print job and the plurality of types of sheet defined by the definition file is not set to any of sheet feed trays of the printing apparatus, a user of absence of sheet.

2. The printing system according to claim 1, wherein the information processing apparatus further comprises
a changing unit configured to change a definition file added to the print job to another definition file.

3. The printing system according to claim 1, wherein a priority is set to the plurality of types of sheet defined by the definition file, and
wherein the selecting unit selects a type of sheet to be used for printing in accordance with the priority.

4. A printing apparatus comprising:
a receiving unit configured to receive, from an external apparatus on a network, a print job to which a definition file defining a plurality of types of sheet that the printing apparatus can use, in a case where a type of sheet to be used for printing is not specified, for printing has been added;
a selecting unit configured to select, in a case where a type of sheet to be used for printing is not specified in the print job, a type of sheet to be used for printing from among the plurality of types of sheet defined by the definition file added to the print job;
a printing unit configured to perform printing using the type of sheet selected by the selecting unit; and
a notifying unit configured to notify, in a case where a type of sheet to be used for printing is not specified in the print job and the plurality of types of sheet defined by the definition file is not set to any of sheet feed trays of the printing apparatus, a user of absence of sheet.

5. The printing system according to claim 4, wherein a priority is set to the plurality of types of sheet defined by the definition file, and
wherein the selecting unit selects a type of sheet to be used for printing in accordance with the priority.

6. A method for controlling a printing apparatus comprising:
receiving, from an external apparatus on a network, a print job to which a definition file defining a plurality of types of sheet that the printing apparatus can use, in a case where a type of sheet to be used for printing is not specified, for printing has been added;
selecting, in a case where a type of sheet to be used for printing is not specified in the print job, a type of sheet to be used for printing from among the plurality of types of sheet defined by the definition file added to the print job;
printing using the type of sheet selected; and
notifying, in a case where a type of sheet to be used for printing is not specified in the print job and the plurality of types of sheet defined by the definition file is not set to any of sheet feed trays of the printing apparatus, a user of absence of sheet.

7. A non-transitory storage medium storing a program for causing a computer to execute the method for controlling the printing apparatus according to claim 6.

* * * * *